O. C. GEORGE.
VEHICLE REPAIR STAND.
APPLICATION FILED APR. 18, 1917.

1,254,794.

Patented Jan. 29, 1918.
2 SHEETS—SHEET 1.

WITNESSES:

INVENTOR.
OLLIE C. GEORGE
BY
ATTORNEY

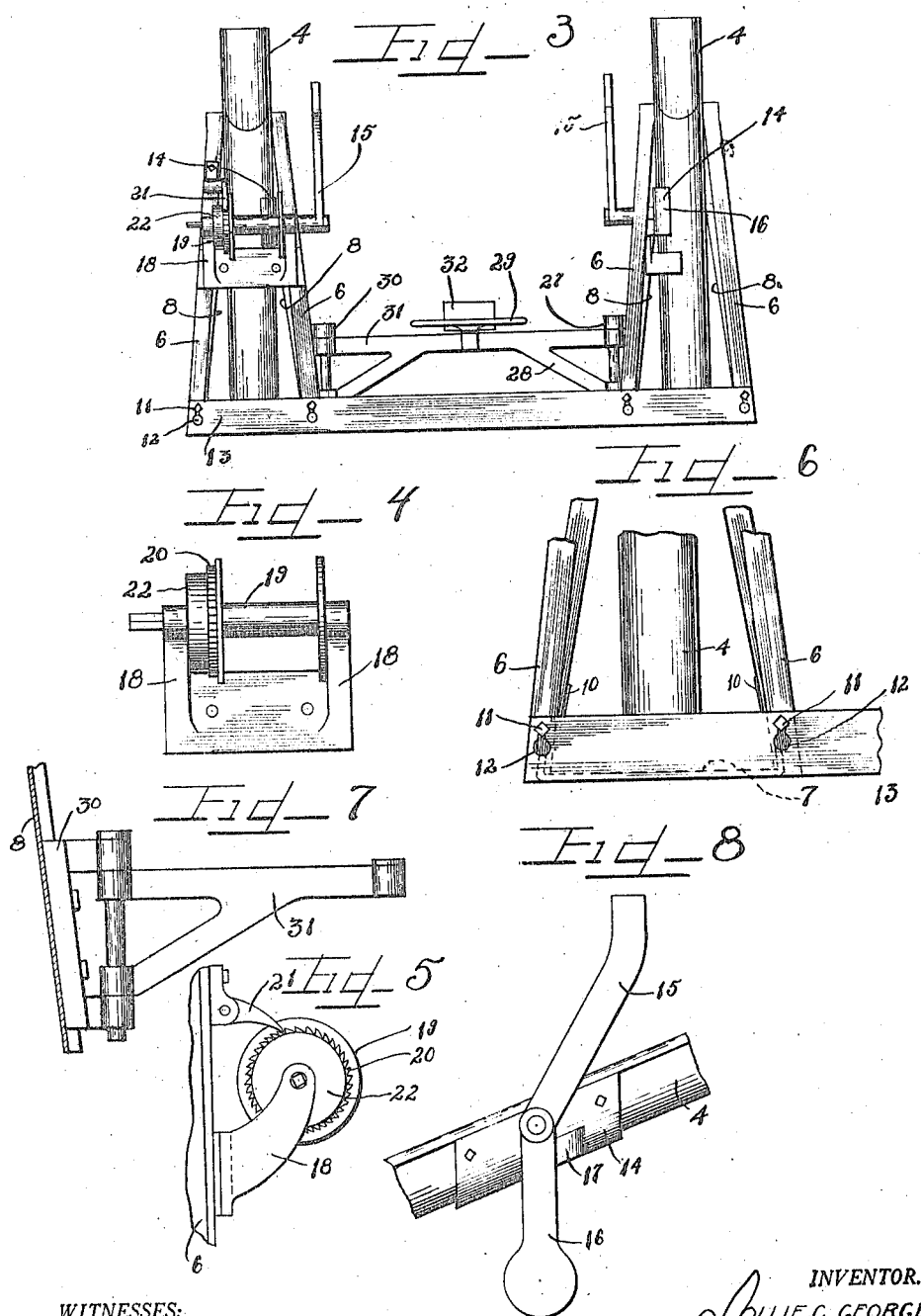

UNITED STATES PATENT OFFICE.

OLLIE C. GEORGE, OF CHICAGO, ILLINOIS.

VEHICLE-REPAIR STAND.

1,254,794.  Specification of Letters Patent. Patented Jan. 29, 1918.

Application filed April 18, 1917. Serial No. 163,022.

*To all whom it may concern:*

Be it known that I, OLLIE C. GEORGE, a citizen of the United States, and a resident of the city of Chicago, in the county of Cook and State of Illinois, have invented certain new and useful Improvements in Vehicle-Repair Stands; and I do hereby declare that the following is a full, clear, and exact description of the same, reference being had to the accompanying drawings, and to the numerals of reference marked thereon, which form a part of this specification.

Heretofore, in working beneath vehicles for repair or adjustment, it has been the general practice to move the vehicle into position over a pit, thus permitting the workman to stand upright in the pit, with the underneath parts of the vehicle conveniently accessible. There are many objections, however, to the use of a pit in a repair shop, chief among which may be mentioned that the pit is permanently situated so that work can only be done upon the vehicle when brought into position over the pit. My invention, however, relates to an inclined stand, upon which the vehicle is moved under its own power, or drawn by suitable means provided for the purpose, thus tilting the machine upwardly from the floor so that the underneath parts of the vehicle are easily accessible. A stand of this construction may be placed at any convenient location, and a number thereof may be provided so that work may be performed upon a number of vehicles simultaneously. When not in use, the parts of the stand may be readily collapsed and moved so as not to require as much space as when in use.

It is an object therefore of this invention to construct an inclined stand upon which a vehicle is rolled to inclined position, with either end thereof elevated, as desired, and with automatic means operating to interlock with an axle of the vehicle to retain the vehicle in position upon the stand.

It is also an object of this invention to construct a repair stand upon which the vehicle may be drawn, and provided with cable connections adapted to be engaged upon an axle at the lower end of the vehicle to draw the vehicle upwardly upon the stand and to retain the vehicle thereon by means which permit release of the cable connections.

It is also an object of this invention to provide an inclined stand upon which a vehicle may be drawn under its own power or through suitable mechanisms provided for the purpose, and after the vehicle has been drawn to a predetermined point on the stand, with means acting automatically to engage the same and hold the vehicle so elevated, permitting release of the draft mechanisms.

Other and further important objects of the invention will be evident from the disclosure in the drawings and specification.

The invention (in a preferred form) is illustrated in the drawings and hereinafter more fully described.

On the drawings:

Fig. 3 is a front end view of the frame shown in Fig. 2.

Fig. 4 is an enlarged front view of the bracket and windlass detached from the frame.

Fig. 5 is a side view thereof, shown attached on the frame.

Fig. 6 is a front detail view of the lower end of one of the standards at the front end of the machine.

Fig. 7 is an enlarged detail view of one of the swinging tool box or seat brackets connected on the frame.

Fig. 8 is an enlarged side view of one of the gravity dogs for co-action with the axle of a vehicle pivoted on the inclined tracks of the frame.

As shown on the drawings:

Figure 1:
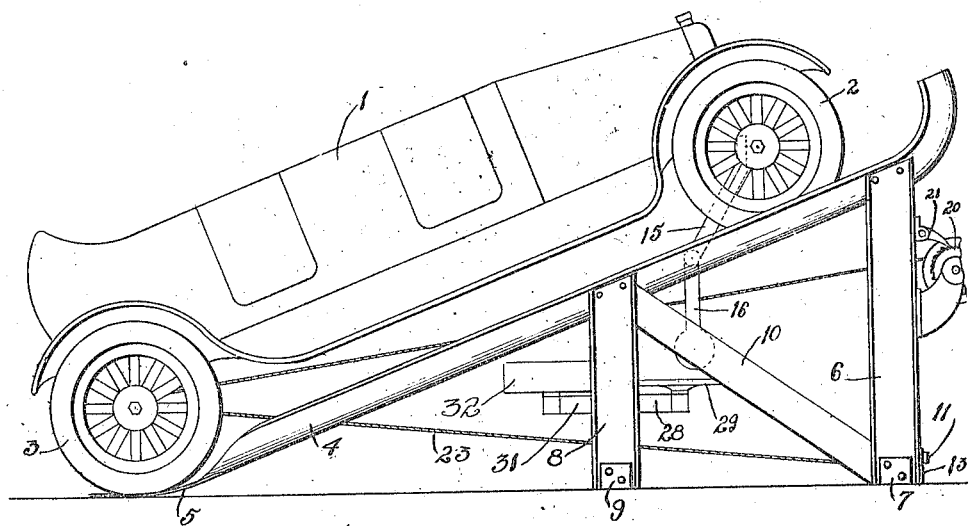
Figure 1 is a side elevation of a stand or frame embodying the principles of my invention, with a motor car mounted thereon.

In Fig. 1, a motor car is denoted as a whole by the reference numeral 1, and is provided with front wheels 2, and rear wheels 3. The frame consists of two inclined runways or tracks 4, which are curved concave upwardly so as to receive the vehicle tires, and at their lower ends flare outwardly to facilitate entrance of the wheels thereinto as the vehicle moves onto the frame. Connected on each side of each of the inclined track members 4, at the upper forward ends thereof, are channel iron braces or end supporting legs 6, each pair of which is connected at their bases by a shoe 7, shown in Figs. 1 and 6. Intermediate their ends, said track members 4, are supported upon channel iron bracing legs 8, and each leg of a pair is connected to the other by a shoe 9, similar to the shoe 7. A diagonal brace member 10, extends downwardly from the upper end of each pair of legs 8, to the lower end of each pair of the legs 6, as clearly shown in Fig. 1. Projecting bolts or studs 11, are provided upon the forward surfaces at the lower ends of each of the channel legs 6, as shown in Figs. 3 and 6, and key-hole shaped slots 12, are provided in a detachable cross-bar frame member 13, adapting the frame member to be engaged therewith to brace the supporting legs apart for the respective track members 4, so that the same are disposed in proper separated relation. Attached by means of curved shoes 14, upon the inner side walls of the respective track members 4, are pivoted gravity acting stop levers 15, each having a counterweight 16 with the counterweight arm adapted to swing against a stop 17, on said shoe to prevent retractive movement of the stop lever 15. Attached upon one pair of uprights 6, is a bracket having arms 18, between which a windlass 19, is journaled, comprising a ratchet gear 20, for co-action with a pawl 21, to prevent reverse rotation thereof, and with a reduction gear mechanism inclosed within a casing 22, forming a part of the windlass.

Figure 2:
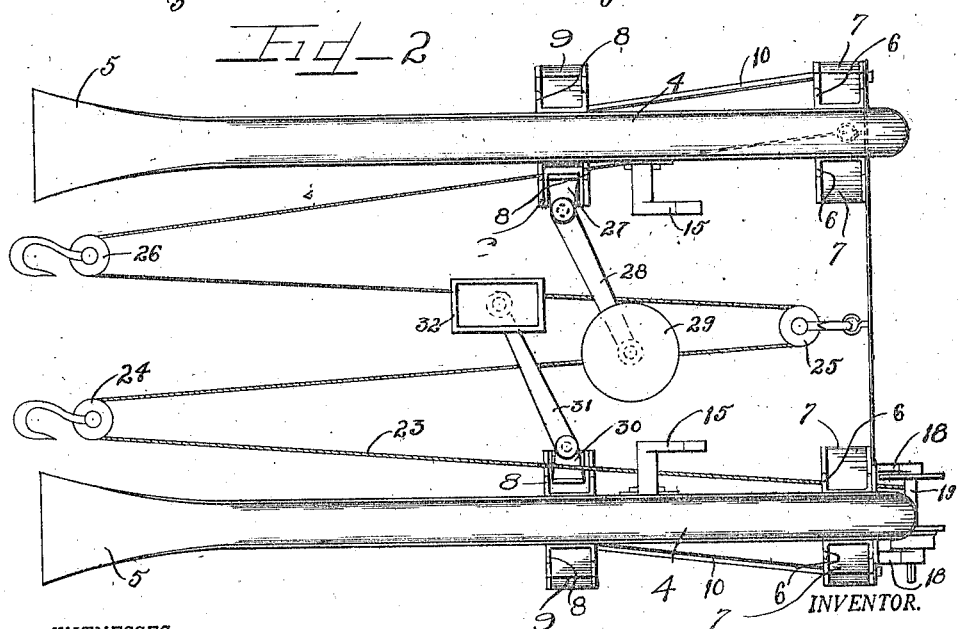
Fig. 2 is a top plan view of the frame.

As clearly shown in Figs. 1 and 2, a cable 23, is connected around the drum of the windlass 19, and is led rearwardly through a sheave on a hook 24, then forwardly around an idler sheave 25, which is connected upon the cross-frame member 13, thence rearwardly through another sheave on a hook 26, and then forwardly to the front end of the frame where the end of the cable is secured. A bracket 27, is secured upon one of the intermediate channel legs 8, and pivoted therein is a swinging arm 28, on which a stool or seat 29, is mounted. Similarly, a bracket 30, is secured upon the opposite channel leg 8, and journaled therein is an arm 31, which at its end supports a tool box 32.

The operation is as follows:

Each of the track sections and its respective supporting uprights comprises a separate unit, and when the frame is to be used, said units are connected in properly spaced relation by the detachable cross-frame bar 13. At times when the frame is not in use, the detachable frame bar 13, is disconnected from the supporting legs of the track sections, and the track sections are then moved to one side so as not to take up any undue amount of space.

When the device is used, the hook members 24 and 26, are engaged on the rear axle or other convenient point on the vehicle, and the windlass 19, is then operated by means of a suitable crank or other means to draw up the cable 23, thereby hauling the vehicle upwardly on the inclined track members 4. It is obvious, however, that the vehicle may be driven upwardly under its own power, if the power of the vehicle is available for the purpose. When the vehicle moves upwardly upon the track members 4, the gravity levers or dogs 15, are struck forwardly and downwardly by the front axle of the vehicle, and immediately swing upwardly behind the axle and, due to the fact that the counterweight arms 16, bear against the stops 17, the vehicle is held by said stop arms 15, from retractive movement on the frame, that is, after the cable 23, has been slacked away to permit the vehicle to move rearwardly into contact with the stop arms 15. The cable 23, may then be detached from the frame, so as not to interfere with movements of a workman beneath the vehicle. The swinging stool 24, and tool box 32, which are pivoted on arms, are convenient means for the workman working beneath the vehicle.

I am aware that various details of construction may be varied through a wide range without departing from the principles of this invention, and I therefore do not purpose limiting the patent granted otherwise than necessitated by the appended claims.

I claim as my invention:

1. An elevating frame for a vehicle comprising inclined track members, means associated therewith for hauling a vehicle upwardly thereon, and automatically operating mechanism to retain a vehicle in elevated position on said track members.

2. An elevating frame for vehicles comprising inclined runway members for a vehicle, and means associated therewith to interlock with the vehicle to hold the same upon said runway members after the vehicle has been moved upwardly thereon.

3. An elevating frame comprising inclined track members, means associated therewith for hauling a vehicle upwardly thereon, automatically operating gravity acting stop members to engage with the vehicle to prevent retractive movement of the vehicle on said track members, and means detachably connecting said respective track members one to another.

4. An elevating frame comprising inclined track members, the lower ends of said track members flanged and flaring outwardly to permit easy movement of a vehicle thereon, means for elevating a vehicle on said track members, mechanism for retaining a vehicle in elevated position on said track members, and means separably connecting said track members one to another.

5. A repairing stand for vehicles comprising inclined members on which the vehicle wheels run, a windlass and cable for pulling the vehicle upon the inclined members and pivoted members adapted to automatically engage and hold the vehicle on the supports in inclined position permitting the cable being released therefrom.

In testimony whereof I have hereunto subscribed my name in the presence of two subscribing witnesses.

OLLIE C. GEORGE.

Witnesses:
CHARLES W. HILLS, Jr.,
EARL M. HARDINE.